United States Patent
Allmendinger et al.

(10) Patent No.: US 11,110,873 B2
(45) Date of Patent: Sep. 7, 2021

(54) BATTERY ELIMINATOR CIRCUIT APPARATUS, SYSTEM, AND METHOD FOR A MODEL VEHICLE

(71) Applicant: TRAXXAS LP, McKinney, TX (US)

(72) Inventors: Otto Karl Allmendinger, Rowlett, TX (US); Scott Rollin Schmitz, Lewisville, TX (US); Jonathan Scott Wood, Frisco, TX (US); William Huang, McKinney, TX (US)

(73) Assignee: TRAXXAS LP, McKinney, TX (US)

( * ) Notice: Subject to any disclaimer, the term of this patent is extended or adjusted under 35 U.S.C. 154(b) by 0 days.

(21) Appl. No.: 16/459,410

(22) Filed: Jul. 1, 2019

(65) Prior Publication Data
US 2020/0189499 A1    Jun. 18, 2020

Related U.S. Application Data

(60) Provisional application No. 62/692,458, filed on Jun. 29, 2018.

(51) Int. Cl.
*B60R 16/033*    (2006.01)
*H04B 1/08*    (2006.01)
*G05D 1/00*    (2006.01)

(52) U.S. Cl.
CPC .......... *B60R 16/033* (2013.01); *G05D 1/0011* (2013.01); *H04B 1/082* (2013.01)

(58) Field of Classification Search
CPC ..... B60R 16/033; B60R 16/03; G05D 1/0011; H04B 1/082
USPC .................................. 307/9.1, 10.1
See application file for complete search history.

(56) References Cited

U.S. PATENT DOCUMENTS

2012/0330481 A1\* 12/2012 Feldkamp ............ G05D 1/0022
701/2

\* cited by examiner

*Primary Examiner* — Hal Kaplan
(74) *Attorney, Agent, or Firm* — Daryl R. Wright; Greg Carr

(57) ABSTRACT

An auxiliary Battery Eliminator Circuit (BEC) and method are provided. The auxiliary BEC may include a receiver plug-in port with a low voltage power and ground connection and a receiver communication connection and an electronic speed control plug-in port comprising a low voltage power and ground connection and an electronic speed control communication connection. In addition the auxiliary BEC may include a battery pre-wire connection for electrically coupling to a high voltage positive terminal of a high voltage battery. Wherein the auxiliary BEC passes through communication signals between a receiver and the electronic speed control via the receiver communication connection and the electronic speed control communication connection. Wherein the auxiliary BEC provides converted high voltage power from the high voltage battery for the receiver and herein the auxiliary BEC powers on and off corresponding to input from the low voltage power and ground connection of the electronic speed control.

9 Claims, 3 Drawing Sheets

BATTERY ELIMINATOR CIRCUIT APPARATUS, SYSTEM, AND METHOD FOR A MODEL VEHICLE

This application claims the benefit of a related U.S. Provisional Application Ser. No. 62/692,458 filed Jun. 29, 2018, entitled "BATTERY ELIMINATOR CIRCUIT APPARATUS, SYSTEM, AND METHOD FOR A MODEL VEHICLE," to Otto Karl Allmendinger, et al., the disclosure of which is incorporated by reference herein in its entirety.

BACKGROUND

The following descriptions and examples are not admitted to be prior art by virtue of their inclusion in this section.

Model Vehicles, controlled through a radio link such as Radio Controlled (R/C) Cars, Planes, Trucks, and Boats, among others, have greatly evolved due to advances in technology, chemistry, and computer science. An early R/C Car may have had a high power battery system (for example, such as a rechargeable NiCd battery pack) to send power to the drivetrain and a separate lower power battery system (for example, such as individual AA batteries) to power the receiver along with various servos. Due to weight, space, and cost constraints, the lower power battery system was replaced with a Battery Eliminator Circuit (BEC), powered by the high power battery system, but outputting a lower power level for the receiver and servos. These BECs are typically incorporated into an Electronic Speed Control (ESC) to reduce packaging and space requirements. However, if a user wants to modify the system originally matched to the ESC and BEC by incorporating higher powered servos for example, an auxiliary BEC needs to be grafted into the system, typically by cutting and soldering connections to an existing wiring harness.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

Radio Controlled (R/C) vehicles, such as cars, trucks, boats, drones, planes, etc., have developed into a major hobby industry. One aspect of the hobby is the availability and potential enhancement of a variety of aftermarket parts. For example, but not limited to this descriptive example, off-road R/C four wheel drive vehicles referred to as crawlers are a way for a hobbyist to test their skills by taking a vehicle through an off-road course similar to those experienced by drivers of full size vehicles.

These courses can be quite difficult and often result in a vehicle getting jammed or wedged between rocks or obstacles. In order to control a vehicle on such a course, the aftermarket industry has developed high power/torque servos to overcome the difficulties of trying to direct large, rubber covered tires when placed in such a position.

However, aftermarket servos usually require more power than the typically supplied Original Equipment Manufacturer (OEM) servos. Power is generally supplied to the OEM servos via a Battery Eliminator Circuit (BEC)(internal BEC) installed within an Electronic Speed Control (ESC), which is used to apportion power to the drivetrain.

Accordingly, often the aftermarket servos will exceed the power rating and capacity provided by the internal BEC within the ESC. In order to address this situation, Auxiliary or External BECs are specifically designed to provide this additional required power. But, an external BEC is installed by hardwiring the external BEC into the vehicles. This process requires basic electrical circuit knowledge, soldering ability and soldering equipment, activities depending upon the skill of the user. Further, the internal BEC must also be addressed to prevent the two BEC's (internal and external) from sharing the same circuit.

Figure 1A:
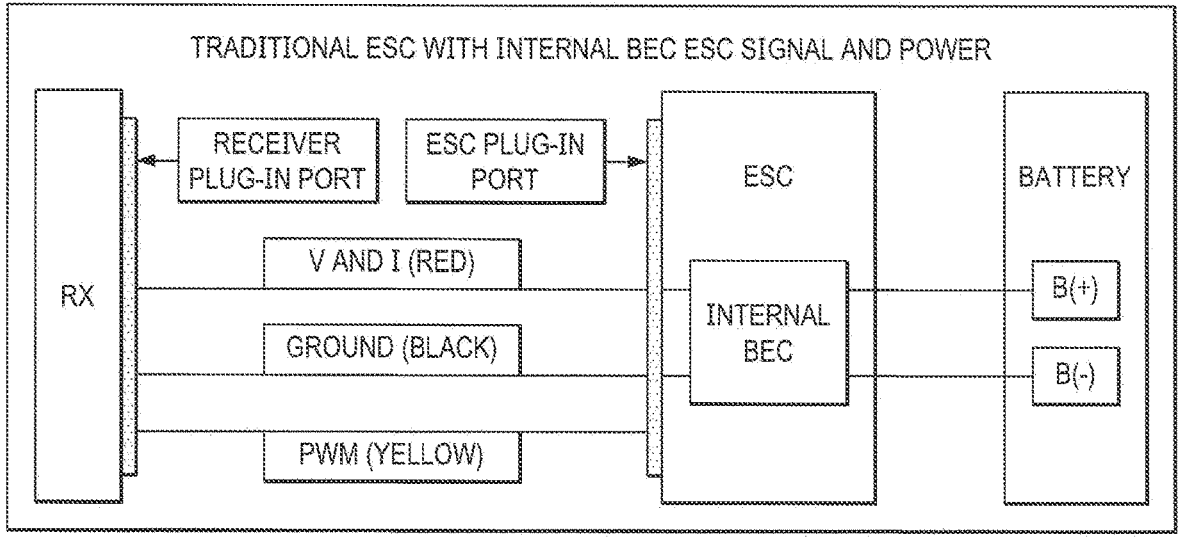
FIG. 1A is a schematic showing a standard Prior Art eletrical system for an R/C model vehicle including an ESC with an internal BEC.

Referring generally to the upper schematic in FIG. 1, this schematic represents a simplified illustration of Prior Art wiring. The battery on the far right is the main power supply for the vehicle. In the illustrative example provided in the background, this is the main power supply for the drivetrain.

With the addition of an internal BEC in the ESC, the main power supply can also supply the lower levels of power for transmission to the Rx (radio receiver/transmitter), and servos (not shown). For the purpose of simplifying this description, the servos should be considered along with the representation of the Rx in the figure.

Two wires, one red (B(+)) and one black (B(−)), take the power from the main battery and provide the power to the ESC. Within the ESC, the internal BEC alters the higher power level of the main power supply into the lower levels of power needed for the Rx and servos.

The ESC is electrically coupled through three wires (in this example). Two wires are the lower level power supply and the third wire is for the communication between the Rx and the ESC. In this example, the communication takes place via Pulse Width Modulation (PWM) on a yellow wire.

The lower level of power (V&I) is transmitted on a red wire. A common ground black wire makes up the third wire.

Figure 1B:
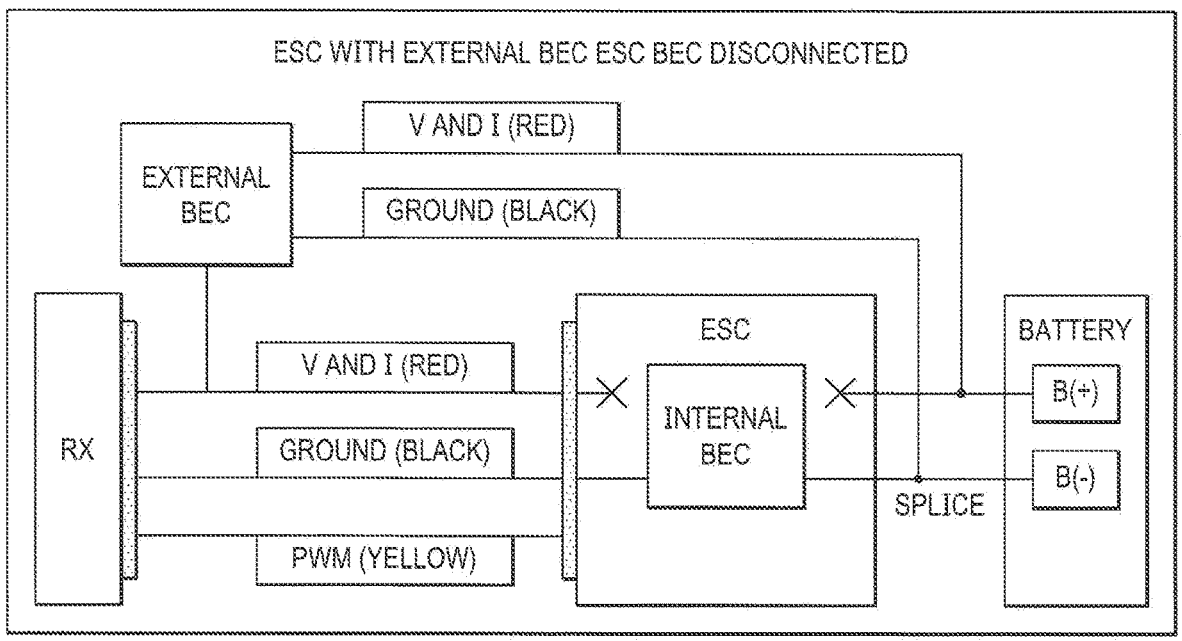
FIG. 1B is a schematic showing a modification of the electrical system of FIG. 1A including splicing in an external BEC.
Figure 2:
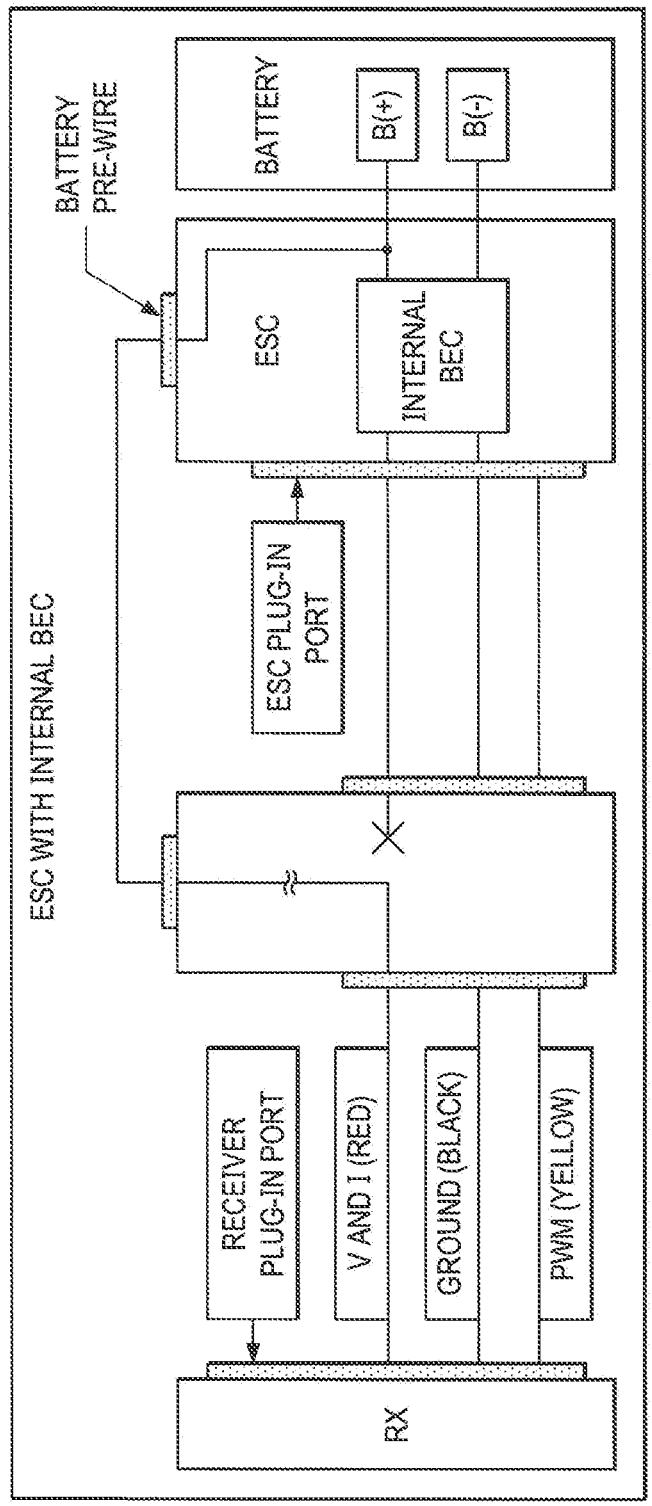
FIG. 2 is a schematic showing an electrical system of an R/C model vehicle including an external BEC and a battery pre-wire connection, according to an embodiment of this disclosure.

Referring generally to the schematic representation in FIG. 1B, this portion of the figure illustrates the Prior Art modifications needed to install an external BEC. Previously, in order to install an external BEC into a R/C vehicle, a user would have to disconnect the red wire between the ESC and Rx and servos. This disconnects the power supplied by the internal BEC (shown by 'ESC BEC disconnect' and the instruction 'modification to ESC').

Then a user would have to splice into the main power supply between the battery and ESC (as shown by the instruction 'splice'), to power the external BEC, illustrated by Ext. BEC. Leaving from the Ext. BEC is the V&I for the Rx and the servos (although this is incorrectly shown in the power supply to the Ext. BEC). The result is that the Ext. BEC supplies the V&I to the Rx and servos, and the ESC communicates directly with the Rx and servos via the remaining two wires of the three wire bundle.

One additional step that a user would have to perform is to manually turn the external BEC on and off during the power up and power down of the R/C vehicle. Since the external BEC is outside of the ESC and outside of the control of the ESC, the constant supply of main battery power would mean that the external BEC is powered on as soon as the external BEC is spliced into the main power supply wires. Usually, the external BEC has a manual switch to turn the external BEC on and off independently of the ESC. In some cases however, if an external BEC is inadvertently left on after the user powers down the R/C vehicle, the external BEC can drain the battery and possibly cause damage to the battery.

Figure 3:
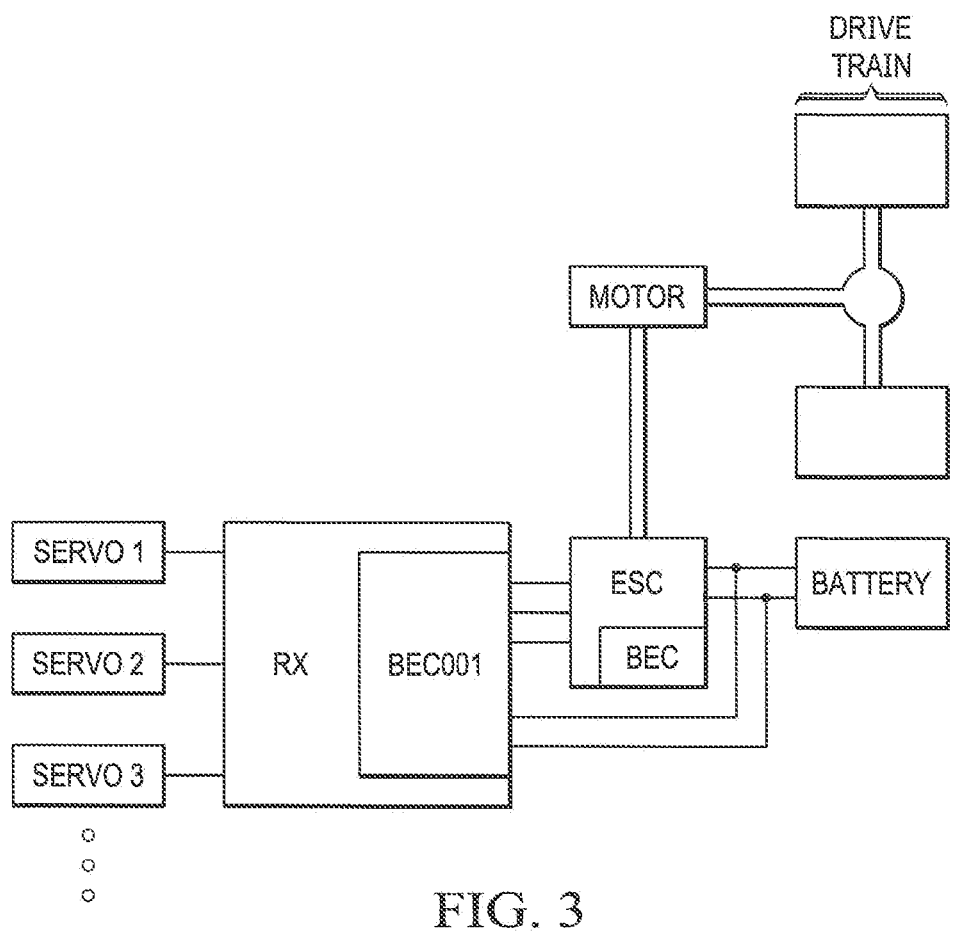
FIG. 3 is a schematic showing a receiver incorporating an internal BEC according to another embodiment of this disclosure.

Referring generally to FIG. 3, an embodiment of this disclosure allows the ESC to plug directly into BEC001. BEC001 is an external BEC but it passes through the communication between the ESC and the Rx and servos, but does not pass through the power of the internal BEC (BEC001 disconnects ESC BEC V&I). This saves the user from having to cut the three (or more) wire bundle and physically modifying the harness, resulting in a more robust system since a cut wire requires termination and care must be taken not to cut the insulation on the other two wires.

In the figure, power is supplied to BEC001 via a battery prewire from the ESC. This eliminates the need to splice into the main battery power supply wires. This embodiment allows the user to install a 100% removable external BEC into their vehicle, as compared to some hard-wired Prior Art external BEC's and the wiring modifications they required.

In addition to preventing the internal BEC's V&I from being transmitted to the Rx and servos, BEC001 uses the ESC's internal BEC in order to determine when to turn on and off. As stated earlier, some Prior Art external BECs will turn on when a battery is connected to the system. But since the ESC and the external BEC are not combined together, the external BEC will power on the Rx equipment, but the ESC may remain unpowered until switched on. Only when the ESC is powered on will the system become 100% functional.

In some embodiments of this disclosure, when a battery is connected to a system containing BEC001, the user powers on the ESC as they would typically do, but powering on the ESC results in powering on the entire system, BEC001 included. BEC001 monitors the ESC's internal BEC to initiate a power on state. Such monitoring may take place via voltage level detection, current detection, or communication signal. Additionally, the entire system including BEC001 will power off when the ESC is powered off.

One aspect of this embodiment is that a Low Voltage Detection (LVD) circuit is not needed within the BEC001. Since over discharging a battery may result in irreversible damage to the battery, most ESC's have a LVD to shut down whenever a low voltage threshold is crossed. Therefore, an ESC will generally automatically power off when their LVD algorithms determine that the input voltage is too low to continue functioning. When the ESC powers off, the internal BEC will also cease outputting voltage, for example. When this voltage is not seen by BEC001, BEC001 will initiate a shut-down state.

Referring generally to FIG. 3, another embodiment of this disclosure uses a combination Rx/BEC001 so that the receiver/transmitter is exchanged when a user is looking to alter the power supply to aftermarket servos. As shown in this illustrative figure, BEC001 is within the Rx. Even though BEC001 is shown as physically co-located with the Rx, essentially the functionality of the BEC001 may be incorporated into the Rx instead of a separate, discrete component wired together. In addition, a single BEC001 is functionally shown with the Rx, but the BEC001 functionality may be distributed to the Rx and servos as desired.

In some embodiments, the distributed BEC001 would still require transmission of the communication signal between the Rx and servos and the ESC, in addition to the power supplied by the distributed BEC001 in order to properly actuate the servo mechanisms. As shown in illustrative FIG. 3, the ESC may be electrically coupled to a motor which powers a drive train. In this case, two wheels are shown, but a drivetrain can include a number of variations, such as, but not limited to, propellers, four or more wheels, or less than two wheels, or any other mechanism used to drive an R/C vehicle.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A radio-controlled vehicle comprising:
   a receiver plug-in port comprising a low voltage power and ground connection and a receiver communication connection;
   an auxiliary battery eliminator circuit electrically coupled to both an electronic speed control plug-in port comprising a low voltage power and ground connection and an electronic speed control communication connection;
   wherein the electronic speed control further comprises a battery pre-wire connection for electrically coupling the auxiliary battery eliminator circuit to a high voltage positive terminal of a high voltage battery;

wherein the auxiliary battery eliminator circuit passes communication signals between the receiver and the electronic speed control via the receiver communication connection and the electronic speed control communication connection;

wherein the auxiliary battery eliminator circuit provides converted high voltage power from the high voltage battery for the receiver; and wherein the auxiliary battery eliminator circuit powers on and off corresponding to input from the low voltage power connection and the ground connection of the electronic speed control.

2. The radio-controlled vehicle according to claim 1, wherein the auxiliary battery eliminator circuit powers on after registering a voltage across the low voltage power and the ground connection of the receiver plug-in port.

3. The radio-controlled vehicle circuit according to claim 1, wherein the auxiliary battery eliminator circuit powers off after registering a substantially zero voltage across the low voltage power connection and the ground connection of the electronic speed control plug-in port.

4. The radio-controlled vehicle according to claim 1, wherein the auxiliary battery eliminator circuit powers on after registering a current flowing through the low voltage power connection and the ground connection of the electronic speed control plug-in port.

5. The radio-controlled vehicle according to claim 1, wherein the battery pre-wire connection is a separate electrical output from the electronic speed control.

6. The radio-controlled vehicle circuit according to claim 1, wherein the auxiliary battery eliminator circuit is integrated with the receiver.

7. A method for adding an auxiliary battery eliminator circuit comprising:

electrically coupling the auxiliary battery eliminator circuit to both
an electronic speed control and a receiver;

electrically coupling a B(+) terminal and a B(−) terminal from a battery to the electronic speed control;

electrically coupling the auxiliary battery eliminator circuit to the B(+) terminal and the B(−) terminal via the electronic speed control;

wherein the auxiliary battery eliminator circuit passes communication signals between the receiver and the electronic speed control via a pulse width modulation connection to both the receiver and the electronic speed control;

wherein the auxiliary battery eliminator circuit powers on and off corresponding to input from an internal battery eliminator circuit of the electronic speed control; and wherein the auxiliary battery eliminator circuit provides low voltage power to the receiver via the low voltage power connection and the ground connection of the electronic speed control.

8. The method of claim 7, wherein, the B(+) terminal is electrically coupled to the auxiliary battery eliminator circuit via a battery pre-wire connection from the electronic speed control.

9. The method of claim 7, wherein the communication between the receiver and the electronic speed control is pulse width modulation communication.

* * * * *